United States Patent [19]

Stafford

[11] 4,052,090
[45] Oct. 4, 1977

[54] MULTIPORT SWIVEL JOINT

[75] Inventor: Donald Claude Stafford, Hinsdale, Ill.

[73] Assignee: Chicago Bridge & Iron Company, Oak Brook, Ill.

[21] Appl. No.: 672,273

[22] Filed: Mar. 31, 1976

[51] Int. Cl.² ............................ F16L 9/20; F16L 39/04
[52] U.S. Cl. ............................................ 285/61; 9/8 P; 285/136
[58] Field of Search ...................... 9/8 P; 285/136, 61, 285/190

[56] References Cited

U.S. PATENT DOCUMENTS

| | | | |
|---|---|---|---|
| 2,781,134 | 2/1957 | Weir et al. | 285/136 X |
| 3,351,360 | 11/1967 | Faccou | 285/136 X |
| 3,430,670 | 3/1969 | Hopkins | 285/136 X |
| 3,698,433 | 10/1972 | Dobler et al. | 285/136 X |

Primary Examiner—Thomas F. Callaghan
Attorney, Agent, or Firm—Merriam, Marshall, Shapiro & Klose

[57] ABSTRACT

A multiport swivel joint suitable for use in loading a tanker at an off-shore mooring terminal comprises a plurality of toroidal or doughnut-shaped conduits which are horizontally arranged and vertically spaced along a common vertical axis. Each toroidal conduit comprises an inner fixed section and an outer section which is arranged for rotation about the common axis, with a suitable rotary seal between the inner stationary and the outer rotatable sections of the toroidal conduit. Inlet connections are made for each fluid stream to a separate one of the inner stationary sections, while the corresponding outlet connections are made at the rotatable outer sections, each of which communicates with and rotates with the tanker about the mooring terminal.

4 Claims, 3 Drawing Figures

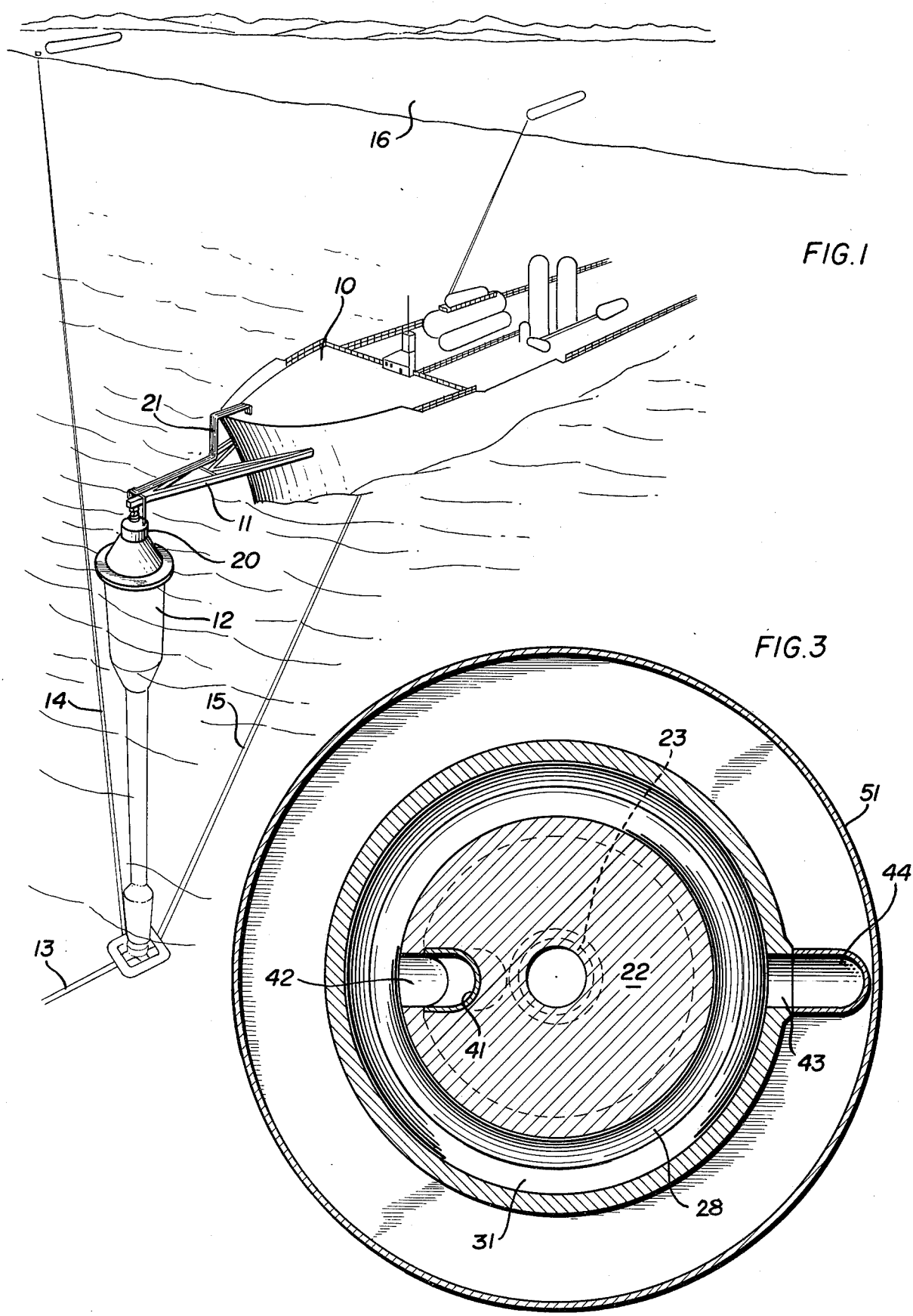

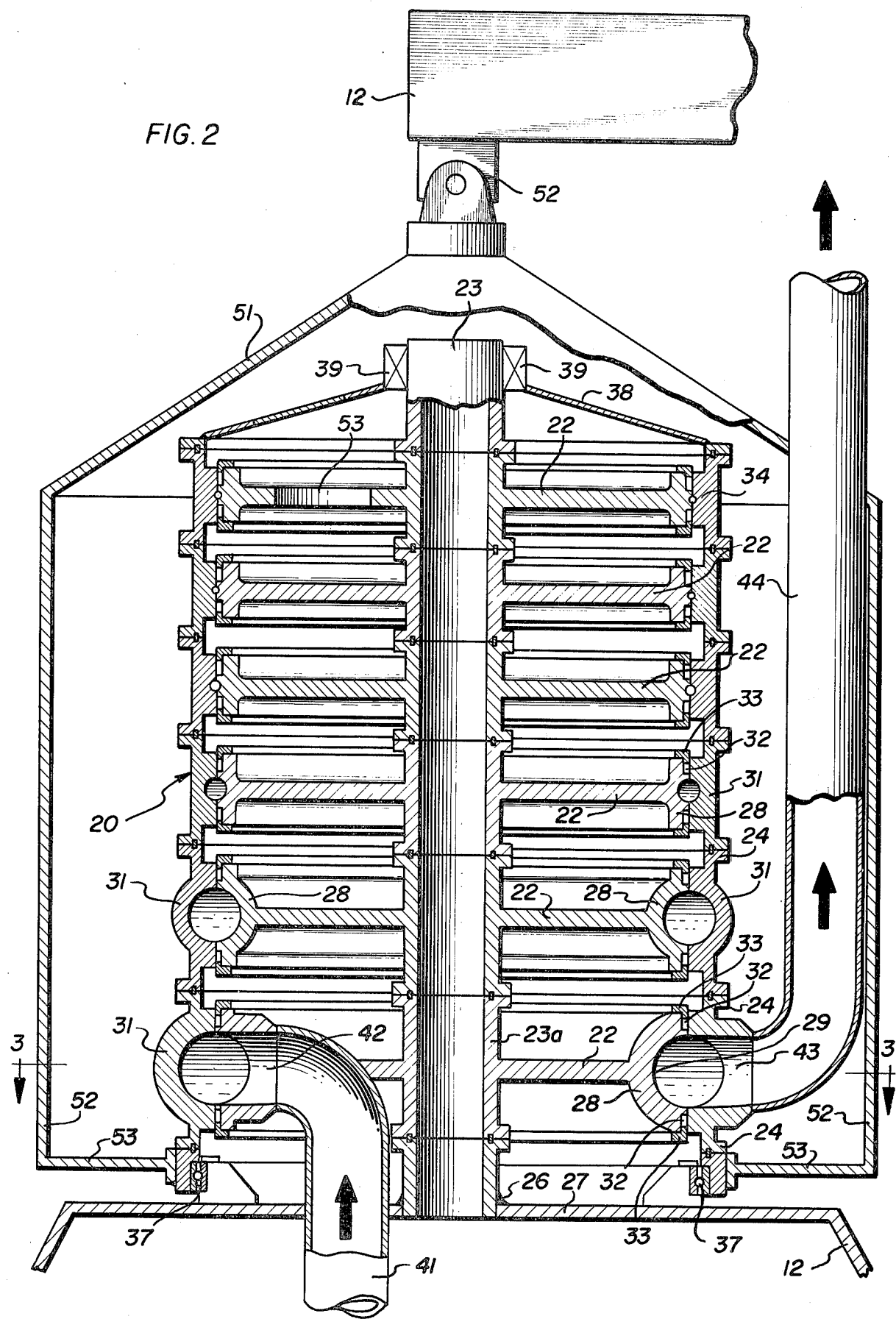

MULTIPORT SWIVEL JOINT

This invention relates to a rotary or swivel joint for fluid flow and more particularly to a multiport swivel joint suitable for use in loading and unloading a plurality of separate fluids to or from an offshore tanker.

The loading and unloading of ocean-going tankers at offshore locations has become common. Such offshore loading stations are used because of overcrowded or non-existent port facilities at a given location or because the draft of the vessel exceeds the available water depth in a port. Offshore loading points of this type, as exemplified by U.S. Pat. Nos. 2,894,268; 3,074,082; 3,077,615; 3,082,440; 3,817,355; and 3,614,869, comprise a fixed or buoyant offshore terminal to which the vessel is moored, usually by a single bow attachment which permits the vessel to swing in a complete circle about the terminal as dictated by the forces of the wind and tide. One or more individual conduits leading from the shore to the terminal permit the vessel to be loaded or unloaded with a variety of fluids which can be under elevated pressure, such as fuel oil, crude oil, water, or liquefied natural gas. In order to permit the vessel to swing about the terminal, all conduits must be equipped with swivel joints which are leak proof and preferably constructed in such a manner that if a leak does occur in one of the fluid conduits, the escaping fluid will not contaminate the other fluid streams.

In one form of multiport swivel joint, i.e., one which is intended to accommodate more than one fluid stream, as shown in U.S. Pat. No. 3,082,440, there is employed an inner vertical fixed cylinder which is compartmented into individual vertical channels, through which the individual fluid streams flow, and an outer cylinder rotatably mounted on the inner cylinder and compartmented into horizontally spaced annular compartments, into each of which one of the vertical channels communicates. Each annular compartment is also provided with an outlet port leading to a conduit attached to a moored vessel. The joints between the inner and outer cylinders are provided with rotary seals which permit relative rotation between the cylinders, thus allowing the moored vessel to swing about the mooring point without interference from or damage to the fluid conduits.

This form of multiport swivel joint has certain disadvantages which reduce its ability to handle a variety of fluid streams which may differ widely in flow volume and operating pressure. Because of the use of single flat structural plates to separate adjoining annular compartments, any leaks caused by differential pressures in adjoining compartments can lead to contamination of one fluid stream by leakage from an adjacent stream at a higher pressure. In addition, since the separating plates are of uniform thickness and the annular compartments are of uniform size, the maximum working pressure rating of all compartments is the same, so that the structure is overdesigned with respect to fluid streams at pressures below the design maximum. In addition the design of the structure requires that access to the rotary seals be from within the annular compartments, making repair or adjustmemnt thereof impossible without taking the fluid conduit out of service.

In accordance with the present invention, there is provided a multiport swivel joint which can be used in conjunction with an offshore terminal to permit the transport of fluids to or from a tanker or other floating vessel while permitting the vessel to rotate about the terminal without restriction. The swivel joint of the invention can be provided with as many individual conduits as necessary to accomodate the individual fluid streams, each conduit being designed to withstand the operating pressure of the fluid therein and the entire swivel joint being so constructed that fluid which might leak from any one conduit does not mix with and contaminate the other fluid streams. In addition, the rotary seals used therein are externally accessible for servicing.

Briefly described, the multiport swivel joint of the invention comprises a plurality of toroidal or doughnut-shaped conduits which are horizontally arranged and vertically spaced along a common vertical axis. Each toroidal conduit comprises an inner fixed section and an outer section which is arranged for rotation about the common axis, with a suitable rotary seal between the inner stationary and the outer rotatable sections of the toroidal conduit. Inlet connections are made for each fluid stream to a separate one of the inner stationary sections, while the corresponding outlet connections are made at the rotatable outer sections, each of which communicates with and rotates with the vessel about the mooring terminal.

The invention will be better understood from the following detailed description thereof, taken in conjunction with the accompanying drawings, in which:

FIG. 1 is a perspective view of a tanker attached by its bow to a loading terminal in an offshore location, showing individual product lines leading from the shore to a swivel joint of the invention at the top of the terminal;

FIG. 2 is an elevation of a typical embodiment of the swivel joint of the invention in partial section showing the individual toroidal conduits used for conveying a variety of individual fluid streams;

FIG. 3 is a sectional view along the line 3—3 of FIG. 2, showing the inlet and outlet connections to an individual toroidal conduit used in the invention.

FIG. 1 shows a typical use of the invention for loading and unloading a tanker 10 attached by means of a mooring yoke 11 to the top of a mooring tower 12, which can be floating or fixed as desired. Conduits 13, 14, and 15 communicate from the shore 16 to the base of the tower 12, pass upwardly within the tower and through swivel joint 20 situated at the top thereof and thence to tanker 10 through conduits 21. The swivel joint 20 of the invention, through which the fluid connections to the tanker 10 are made, permits the tanker to rotate in either direction in a complete 360° circle about the swivel joint without any interference to the flow of fluids through the joint into or out of the tanker.

The construction of the swivel joint of the invention is shown in FIGS. 2 and 3. As there depicted, swivel joint 20 comprises a plurality of parallel circular horizontal support plates 22 which are concentrically arranged and spaced along the height of a central support column 23. For ease of construction the central column 23 can be formed of a number of individual segments, e.g. 23a, the top and bottom edges of which are provided with flanges 24 which are held together by appropriate means, such as bolts not shown. The base of column 23 is firmly affixed, as by welding 26, to the top plate 27 of tower 12.

Attached to the circumference of each of circular support plates 22 is a toroidal conduit assembly preferably having a circular cross-section, defined by two individual relatively rotatable sections 28 and 31. First (inner) section 28, attached to the support plate, has an outwardly facing concave inner surface 29, while second (outer) section 31 has an inwardly facing concave surface 32. When assembled with their concave surfaces in registration, sections 28 and 31 form a toroidal conduit assembly, so that the individual sections, i.e., 28 and 31, will be referred to herein as a "semi-toroidal" sections.

Positioned between the adjoining upper and lower edges of each of first and second semi-toroidal sections 28 and 31 are rotary seals 32 of conventional construction held in place by glands 33 which are fastened by conventional means such as bolts, not shown. For simplicity in construction, it is advisable to make the radius of each first semi-toroidal member (i.e., the distance from the axis of column 23 to the edges of the member) the same, so that only one size of seal 32 is necessary for assembling the swivel joint. Such sizing is also advantageous in that it positions all of the outer semi-toroidal sections 31 in a vertical line, simplifying interconnecting and supporting the outer sections as hereinafter described. The combination of an inner section 28, an outer section 31, and a rotary seal 32 provides a fluid-tight toroidal conduit in which the outer section 31 can be rotated with respect to the inner section 28, while still maintaining the fluid-tight integrity of the conduit.

The multiport swivel joint assembly shown in FIG. 2 is assembled with a plurality of toroidal conduits, one of which is used for each separate fluid stream which is to be transferred through the swivel joint. In the embodiment shown, there are six such toroidal conduits for handling six separate streams, which can vary in volume and working pressure. The uppermost toroidal conduit 34 has the smallest diameter and relatively the thickest walls and is accordingly adapted to handle a fluid stream at an elevated pressure, such as a liquefied natural gas stream. The lowermost toroidal conduit has the largest flow capacity and the lowest pressure rating. The intermediate toroidal assemblies are suitable for intermediate working pressures and fluid flow rates.

In each toroidal assembly, the inner semi-toroidal section, e.g. 28, is supported by a circular plate 22 attached to central column 23. The outer semi-toroidal sections, e.g., 31, of the toroidal conduit assemblies are joined by means of vertical abutting flanges 24 which are interconnected by conventional means such as bolts, not shown. The weight of the structure consisting of interconnected outer semitoroidal sections is supported by circular swivel bearings 37 on plate 27, while the upper end of the structure is stabilized for rotation about central support column 23 by plates 38 attached to bearing 39.

Each of the inner and outer semi-toroidal sections of a toroidal assembly, i.e., 28 and 31, is supplied with a port, e.g., 42, 43, for fluid flow, through which the fluid to be transported enters or leaves the toroidal assembly. In FIG. 2, it is assumed that the fluid is flowing from the base of tower 12 through conduit 41 and inlet port 42 into the lowermost toroidal conduit formed by sections 28 and 31. The fluid then flows around both sides of the toroidal assembly to outlet port 43 and conduit 44 and thence to the vessel which is being filled. Each of the other toroidal assemblies is similarly provided with fluid flow ports, not shown in the drawings, which communicate with the inner and outer semi-toroidal sections thereof.

The swivel joint 20 is enclosed in a housing 51, the base 52 of which is operatively connected by lower plate 53 to flange 24 and swivel bearing 37. Housing 51 thus is free to rotate together with the interconnected outer semi-toroidal sections. Mooring yoke 12 is attached to the top of housing 51 through universal joint 52 which permits the yoke to rotate about orthogonal horizontal axes without affecting housing 51. Rotation of yoke 12 about a vertical axis passing through joint 52, however, causes housing 51 and the interconnected outer semi-toroidal sections of swivel joint 20 to rotate simultaneously. Accordingly, a vessel moored to yoke 12 and the conduits (e.g., 44) between the vessel and swivel joint 20 rotate as a unit, thus eliminating any interference with free rotation of the vessel about the mooring point.

It should be understood that housing 51 is not per se a part of the invention. The protective aspects of the housing are not essential and the rotational force transmitting function can be accomplished in many other ways, as will be apparent to those skilled in the art.

The swivel joint of the invention has several significant advantages over similar joints heretofore known and used for the same purpose. The toroidal conduits have no common walls separating different fluid streams, so that any leakage from one conduit does not enter and contaminate an adjacent stream. The use of vertically spaced support plates 22 permits the rotary seals (e.g., 32) between the semi-toroidal sections (e.g., 28 and 31) to be accessible from points outside the conduit, so that adjustment or minor repair of the seal can be made without taking the conduit out of service. For this purpose, plates 22 and 38 can be provided with manholes, e.g., 53, through which service personnel can reach any conduit as desired. The same manholes facilitate field erection or disassembly of the swivel joint.

Another advantage of the invention flows from the fact that no common separating walls or members are used between the individual conduits. Accordingly, the individual conduits can be designed to accommodate a variety of flow volumes and operating pressures in the most economical manner without the necessity of overdesigning the entire assembly to withstand an elevated pressure which may exist in only one conduit.

The foregoing detailed description has been given for clearness of understanding only, and no unnecessary limitations should be understood therefrom as modifications will be obvious to those skilled in the art.

I claim:
1. A multiport swivel joint for fluid flow comprising:
 a central vertical stationary support;
 a plurality of first circular semi-toroidal members of uniform diameter, each of which has an outer portion adapted to form a first section of a toroidal conduit for the flow of a fluid;
 a plurality of horizontal circular support plates concentrically attached to and vertically spaced along said stationary support, each of said plates being connected at its periphery to one of said first semi-toroidal members;
 a plurality of second circular semi-toroidal members, each of which includes an inner portion adapted to cooperate with said outer portion of one of said first semi-toroidal members to define said toroidal conduit;
 a plurality of rotary sealing means each of which is disposed between one of said outer portions and a corresponding one of said inner portions to create a fluid-tight toroidal conduit while permitting rela- tive rotation between said first and second members;

means for interconnecting said second semi-toroidal members, including vertical flanges attached to the periphery of each of said second members, whereby said second members form a rigid unitary structure;

a rotary bearing operatively connected to the lowermost of said second toroidal members for supporting the weight of said interconnected members and permitting rotation thereof about said central stationary support;

individual fluid inlet means connected to each of said first members; and individual fluid outlet means connected to each of said second members.

2. A swivel joint in accordance with claim 1 wherein said circular plates are provided with openings permitting access to said rotary seals.

3. A swivel joint in accordance with claim 1 wherein said toroidal conduits are circular in cross-section.

4. A swivel joint in accordance with claim 1 wherein said central support is hollow.

* * * * *